Figure 4:
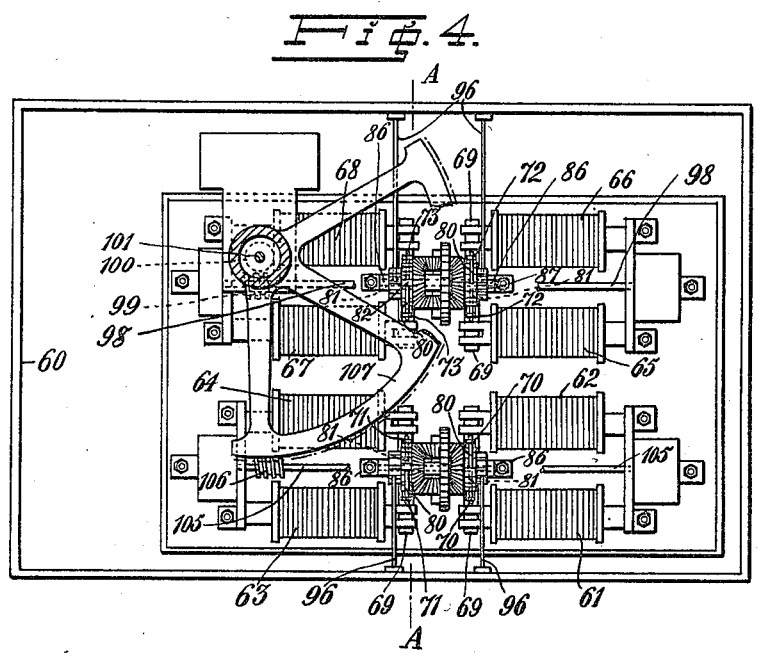

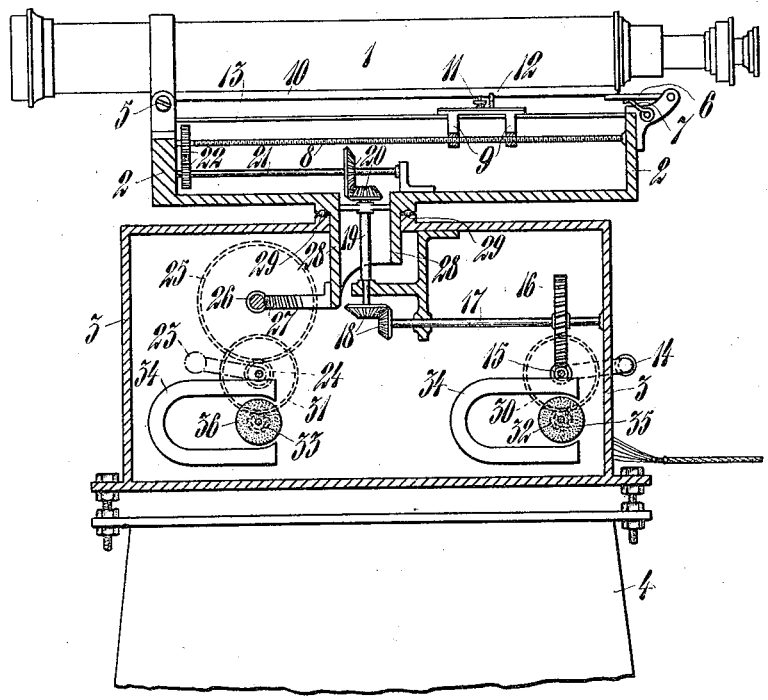

No. 840,778. PATENTED JAN. 8, 1907.
K. O. LEON.
ATTACHMENT FOR RANGE FINDERS.
APPLICATION FILED MAY 25, 1905.
4 SHEETS—SHEET 2.
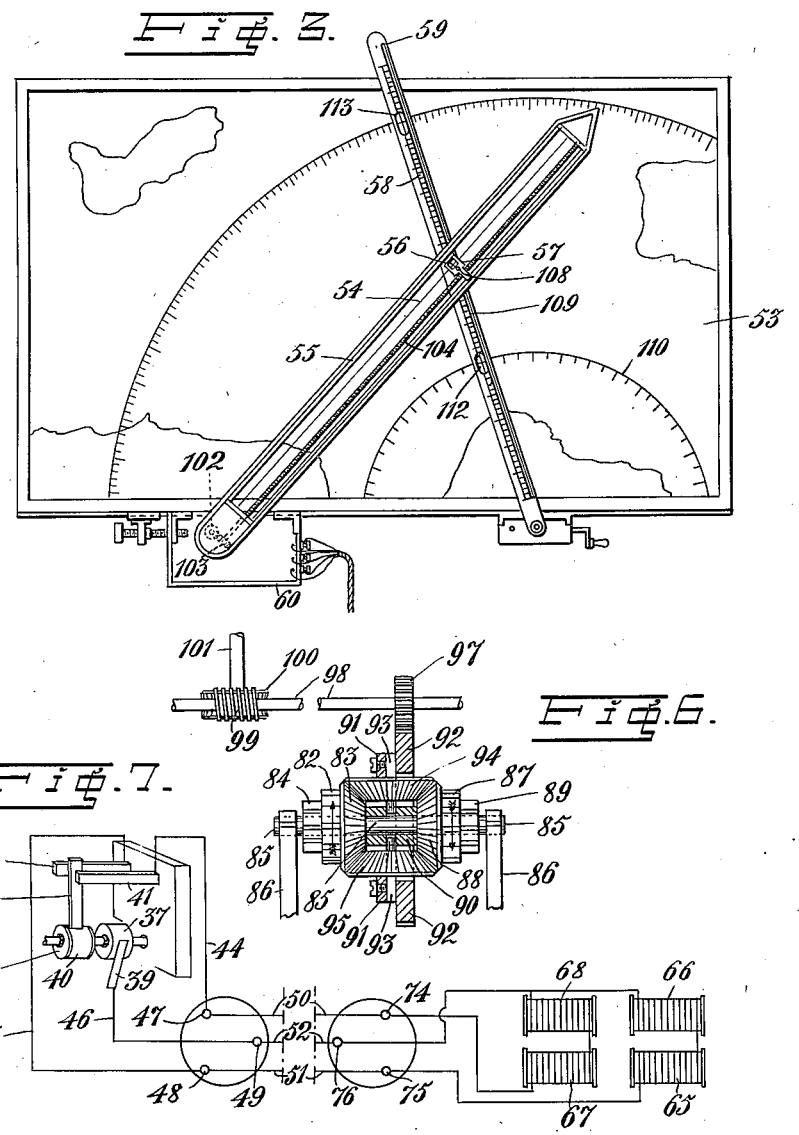
Witnesses
W. P. Burke
J. H. Saunders
Inventor
Karl Oskar Leon
By Richardson
ATTYS.

No. 840,778. PATENTED JAN. 8, 1907.
K. O. LEON.
ATTACHMENT FOR RANGE FINDERS.
APPLICATION FILED MAY 25, 1905.

4 SHEETS—SHEET 3.

Witnesses
W. P. Burke
J. H. Saunders

Inventor
Karl Oskar Leon
By Richardson
Att'ys

No. 840,778. PATENTED JAN. 8, 1907.
K. O. LEON.
ATTACHMENT FOR RANGE FINDERS.
APPLICATION FILED MAY 25, 1905.

4 SHEETS—SHEET 4.

Witnesses
Inventor
Karl Oskar Leon
ATTORNEYS.

UNITED STATES PATENT OFFICE.

KARL OSKAR LEON, OF STOCKHOLM, SWEDEN.

ATTACHMENT FOR RANGE-FINDERS.

No. 840,778.          Specification of Letters Patent.          Patented Jan. 8, 1907.

Application filed May 25, 1905. Serial No. 262,296.

*To all whom it may concern:*

Be it known that I, KARL OSKAR LEON, a subject of the King of Sweden, and a resident of Riddargatan 38, Stockholm, in the Kingdom of Sweden, have invented certain new and useful Improvements in Attachments for Range-Finders, of which the following is a specification, reference being had therein to the accompanying drawings.

It is old to cause a pointer or the like arranged to turn about a point in a map or chart to automatically move according to the axis of a sighting apparatus, such as a telescope, when the latter is placed at a spot on the ground corresponding to the location of the pivot of the ruler on the map or chart. The indication on the map or chart of the position of the object observed has hitherto been performed either by the use of two rulers or pointers turning about different points, in which case obviously two points of observation are necessary, or it has been tried to indicate the distance of the object from the point of observation by means of a galvanometer situated at the other spot. In battering movable objects by secondary bombardment none of these methods fulfils the conditions required as to accuracy and despatch in indicating the instantaneous position of the movable object to be battered, so much the less as most of the apparatus hitherto devised do not work automatically at all in that the ruler does not automatically follow the movements of the sighting apparatus during its turning; but the true direction of the ruler is to be found by turning it to and back until a galvanometer placed in a Wheatstone's bridge takes up a determinate position.

When two points of observation are used for indicating the instantaneous position of the object to be battered, the location of an object can be determined only within a limited space, since in the contrary case the angle between the two sighting-lines will be too obtuse or too acute to allow of a sufficiently distinct determination, and, further, the procedure will be much more complicated than in the case of only one point of observation being used, due to the fact that the system is duplicated and requires more adjustments to be made, whereby special systems of apparatus, such as telephone or telegraph lines between the points of observation, are necessary to enable the observers to communicate, it being obviously necessary that the observers sight at the same object, which in the presence of several hostile ships cannot be attained without certain arrangements.

As before stated, a system based on the principle of only one point of observation is old; but that system did not work automatically, and the distance of the object from the point of observation was indicated at the other spot by means of a galvanometer placed at the latter spot, by which the indications obtained were not sufficiently accurate on account of the resistances of the long lines of connection.

The present invention provides an arrangement by which the position of an object can be perfectly automatically indicated at a distant spot by observation from a single point; and the invention consists in the combination, with the known movable pointer, of a cursor that is caused to automatically move along the pointer by means of electrical impulses arising when the sighting apparatus is turned in the vertical plane, so that the position of the cursor always corresponds to that of the object observed. The distance and the direction of the object from the second spot are directly indicated by a pointer journaled to move about a point corresponding to the receiving-station, the cursor engaging a longitudinal groove in the said pointer.

The accompanying drawings illustrate, by way of example, a system of contrivances constructed so as to make it possible to read off at the battery or place of firing the varying range and station of an object—for instance, a ship—kept in view at the place of observation.

Figure 5:
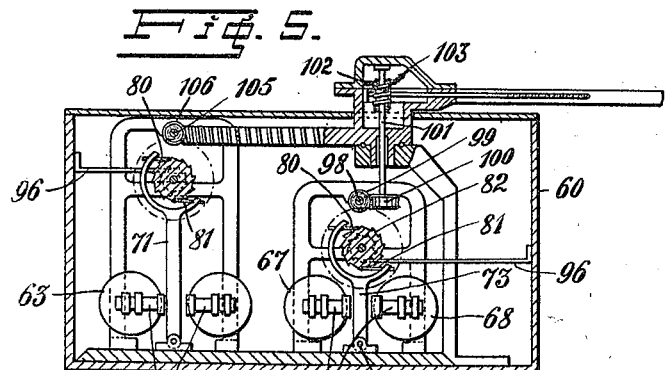
Figure 8:
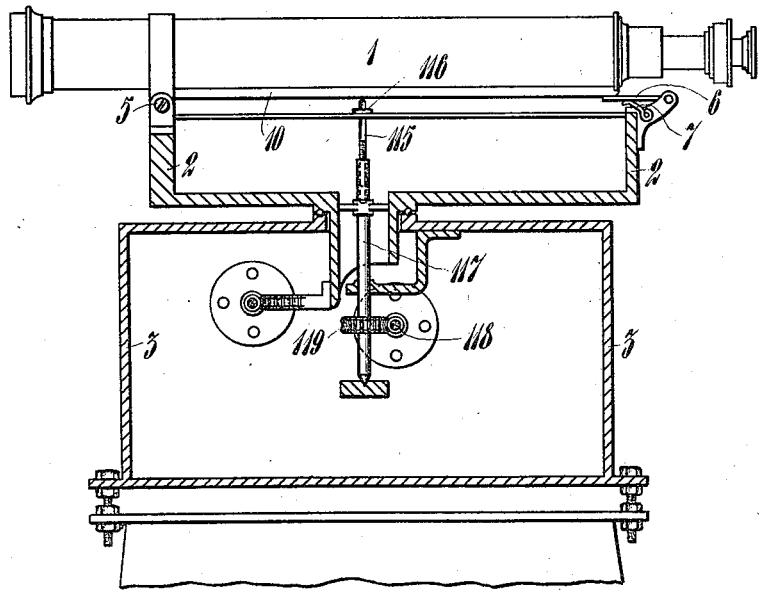
Figure 9:
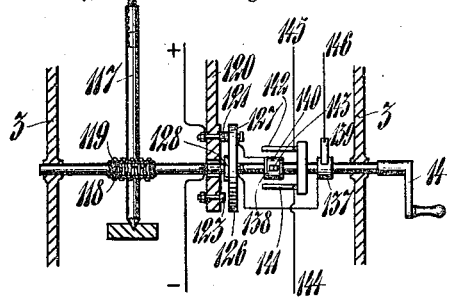
Figure 10:
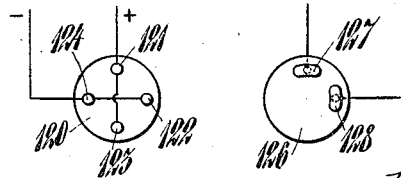

Figure 1 shows the observation contrivance or determinator in elevation and partial section. Fig. 2 is a detail showing in elevation one of the magnetic inductors of the determinator, Fig. 1. Fig. 3 is a top plan view of the indicator. Fig. 4 is a top plan view of the motive mechanism of the indicator, Fig. 3, which, as shown, is inclosed in a box the lid of which is removed in Fig. 4. Fig. 5 is a section in line A A in Fig. 4, viewed from the right-hand side. Fig. 6 is a detail showing a part of the motive mechanism of the indicator. Fig. 7 is a diagram showing the circuit connections between the determinator and the indicator. Fig. 8 shows in elevation and partial section another form of construction of the determinator adapted to work with battery-current. Fig. 9 is a detail showing the contact arrangements of the determinator, Fig. 8. Fig. 10 is a diagram illustrating part of said contact arrangements.

The determinator shown in Fig. 1 consists of a telescope (the ocular in the illustration supposed to be on the right and the objective on the left) resting on a frame 2, rotatable in horizontal direction in the operation-box 3, which itself rests on a fixed support 4. The telescope is at its off end movable about a horizontal shaft or horizontal pivots 5, its fore end resting on a movable lever 6, supported by a spiral spring 7 or the like, the tension of which is measured in such a way that most of the weight of the telescope is dislodged from the cursor 9, movable along the screw 8. The telescope and the frame, as shown in Fig. 1, are constructed in their chief parts on the principles of the Madsen range-finder, which at a comparatively small expense might be adapted for the purpose. As shown in Fig. 1, there is on the under side of the telescope a ruler 10, resting on an adjusting-screw 11, situated in the slide or cursor 9. The adjustment of the telescope is effected by adjusting the screw 11 along a scale 12. The telescope is directed toward the object of observation by turning the screw 8 in either direction so that the cursor 9 is forced to move along the screw guided by a ruler 13 or the like. The contact-point of the ruler 10 against the adjusting-screw 11 being situated when the telescope is properly adjusted somewhat higher than the fulcrum or center of motion of the telescope, it is easily seen that by causing the cursor 9 to move toward or away from the said center the telescope can be directed toward a less or more distant object. If a certain point at the water-line of a ship or, generally speaking, an object moving on the surface of the water is kept in view by the telescope, the varying inclination or angle of depression of the telescope is evidently dependent upon for the distance of the object. This principle in measuring distances, as above stated, is before known and applied—for instance, in the Madsen range-finder—and it need, therefore, not be closer described.

The screw 8 can be turned in either direction by means of a crank 14, on the shaft of which there is a worm 15, engaging a worm-wheel 16 on the motion-transmitting shaft 17, from which the motion is transmitted by means of a bevel-gear 18 to the shaft 19, extending centrally through the vertical hollow pivot of the instrument, thence by means of a bevel-gear 20 to a shaft 21, parallel with the screw 8, and finally by means of a cylindrical gearing 22 to screw 8, which, consequently, on turning the crank 14 either way will turn in a corresponding direction. The transmission of motion from crank 14 to screw 8 can of course be effected by any other suitable gearing; but inasmuch as the directing movement of the telescope takes place within a comparatively small angle it would answer the purpose if to a great turning angle of the crank 14 corresponds a comparatively small turning of the screw 8. For turning the telescope in the horizontal plane a crank 23 may be arranged, on the shaft of which there is a cog-wheel 24, engaging a wheel 25, the shaft of which is parallel to the axis of the crank and provided with a worm 26, engaging a segment 27 on the hollow pivot 28, entering vertically from frame 2 into the operation-box. The mechanism for transmitting motion from crank 23 to pivot 28 may of course be differently arranged and need not be made as shown in the drawing. In order to diminish the friction, frame 2 can suitably be mounted on rollers 29 on the upper surface of the operation-box. The cranks 14 and 23 may conveniently be placed on opposite sides of the operation-box—the one, for instance, on the right side and the other on the left—but they may as well be placed on any side of the box—for instance, on the side facing the operator. Fastened to each crank-shaft is, further, a wheel 30 or 31, respectively engaging a wheel 32 or 33, respectively situated on the shaft of an inductor or armature 35 or 36, respectively placed between the poles of a number of permanent magnets 34.

Fig. 2 shows in elevation one of the inductors 35. Each end of the winding is supposed to be connected with one of two rings 37 and 38, placed on the inductor-shaft, but insulated from the same. A brush 39 is placed in contact with the ring 37. Placed around the other ring 38 there is a socket or shell 40, having a contact-arm 43, entering between two contact pieces or springs 41 42, Fig. 7. When the inductor is rotated in one or the other direction, the shell 40 on the ring 38 turns with the ring until contact 43 touches one or the other of the contact-springs 41 and 42, which causes the shell 40 to stop, while the ring 38 continues to rotate within it. The contact-springs 41 and 42, as well as the brush 39, lying against the ring 37, are connected by means of conductors 44 45 46, respectively, each with one of three contacts 47 48 49, respectively, insulated from the iron construction or conducting-body of the instrument. From the contacts 47 48 49 three insulated conductors lead to the indicator at the place of firing. Inductor 36, connected with crank 23, is provided with similar contact arrangements and conducting-wires, so that the determinator is connected with the indicator by in all six conducting-wires insulated from one another, said wires being suitably inclosed within a single cable.

The indicator, as shown in Fig. 3, comprises a map 53 over the field of observation. This map comprises the observing-station as also the place of the battery with regard to which the position of the object of observation—for instance, a ship—is to be indicated. The first of these two places coincides with the axis or fulcrum of a director or pointer 55, which moves in the horizontal plane and is provided with a sighting-thread 54. When the instrument works, an angular motion is imparted to the pointer 54 in a manner to be described, said motion corresponding with the horizontal motion of the telescope. Movable along the pointer 55 is a cursor 57, likewise provided with two sighting-threads 56, said cursor, when acted upon by electrical means, acquiring a forward or backward motion entirely analogous with the motion of the cursor 9 of the determinator. The second place coincides with the axis or fulcrum of a pointer 59, provided with a scale 58, said pointer being likewise movable in the horizontal plane, the motion of the pointer 59 being effected by the combined motions of the pointer 55 and the cursor 57. The mechanism acting to move the pointer 55 is inclosed in a box 60. (Shown in plan and with the lid removed in Fig. 4 and in section in Fig. 5.) The motion of the pointer is effected by means of two pairs of electromagnets, the one pair of which, comprising electromagnets 61 and 62, serves to turn the pointer in one direction, while the other pair, comprising electromagnets 63 and 64, serves to turn the pointer in the opposite direction. For running the cursor 57 along the pointer 55 there are also two electromagnet pairs, the one of which, comprising electromagnets 65 and 66, serves to move the cursor in one direction, while the other electromagnet pair, comprising electromagnets 67 and 68, serves to move the cursor in the opposite direction. The electromagnets may conveniently be provided with adjustable pole-pieces 69. Placed between the poles of each pair of electromagnets is a polarized armature, the one between the electromagnets 61 and 62 being marked by the figure 70, the one between the electromagnets 63 and 64 by 71, the one between the electromagnets 65 and 66 by 72, and the one between the electromagnets 67 and 68 by 73. The circuit connections of the electromagnets 61 62 63 64 serving to turn the pointer 55 being exactly analogous to those of the electromagnets 65 66 67 68, serving for running the cursor 57 and the arrangements for transmission of motion from the armatures 70 71 72 73, respectively, to the pointer 55 and cursor 57, respectively, being likewise analogous, it will be sufficient to describe the circuits of the electromagnets 65 66 67 68, serving to control the motion of the cursor 57 and the arrangements for the transmission of motion from the armatures 72 and 73 to the cursor 57. The encabled conducting-wires 50 51 52, connected with inductor 35, are led each to one of three contacts 74 75 76 at the indicator. The electromagnet pairs 65 66 and 67 68 are connected at one end with one of the contacts 75 74, respectively, to which the conductors from the contact-springs 42 41 at the inductor 35 are led and at their other end with the third contact 76, connected with the brush 39. When the inductor 35 is turned in either direction, (by which contact 43, as above stated, is brought in contact with one or the other of the contact-springs 41 42,) an alternating current will be transmitted from inductor 35 through one or the other or the two electromagnet pairs 67 68 and 65 66. The circuits from inductor 36 through the electromagnet pairs 61 62 and 63 64 are quite analogous. The electromagnet pair through which the inductor-current flows causes the polarized armature to execute a number of oscillations corresponding to the angle of rotation of the inductor, and thus it is only needed to transmit, by means of some suitable mechanism, the oscillating motion of the armature to pointer 55 or cursor 57, respectively.

The armature 73 is shown in Fig. 5 to be pivoted with its lower end at 77 and provided at its upper part with two arms, forming together a semicircular arch. Each of the arms carries a pin 80 81, respectively, or the like, working in a tangential direction on the teeth of a wheel 82. This wheel 82 suitably constitutes the intermediate part of a series of wheels, the two outer parts of which consist of a bevel-wheel 83 and a ratchet-wheel 84, Fig. 6. The wheels 82 83 84 are firmly connected to one another or made in one piece and journaled on a shaft 85 in such a manner as to be able to rotate freely about the said shaft, the latter being carried at its ends in standards 86, mounted on the bottom of the box 60. The armature 72, Fig. 4, of the electromagnet pair 65 66 is constructed in the same manner as the armature 73 of the electromagnet pair 67 68 and, like the latter armature, acts upon the teeth of a wheel 87, Fig. 6, constituting the intermediate part of a series of wheels of the same construction as that of the former series of wheels—i. e., consisting, except of the wheel 87, of a bevel-wheel 88 and a ratchet-wheel 89, both firmly connected to the wheel 87 or made in one piece therewith and loosely mounted on shaft 85. On account of the two series of wheels facing each other the teeth of the wheels 87 and 89 will have a direction opposite to that of the teeth of the wheels 82 and 84. Loosely mounted upon the middle portion of the shaft situated between the two bevel-wheels 83 and 88 is a sleeve 90, having at its middle two diametrically opposite holes serving as bearings for the inner ends of two pins 93, mounted at their outer ends in bearings 91 at one side of a spur-wheel 92. Loosely mounted on each of the said pins is a bevel-wheel 94 or 95, respectively, meshing with each of the two bevel-wheels 83 and 88. The whole forms a known system of planetary wheels.

Each time the armature 73 is attracted in one or the other direction one or the other of the pins 80 81 acts on the wheel 82, so as to cause the series of wheels 82 83 84 to constantly turn in the direction of the arrow, Fig. 6. Catching in the ratchet-wheel 84, as also in the ratchet-wheel 89, are spring-pawls 96, Figs. 4 and 5, attached to the walls of the box for the purpose of preventing the series of wheels from turning backward. The armature 72 between the poles of the electromagnets 65 66 is disposed in the same way as the armature 73 and during its oscillations acts, by means of pins 80 81, Fig. 4, similar to those above described, on the intermediate wheel 87 of the series of wheels 87 88 89. This series of wheels is turned during the oscillations of the armature 72 in the opposite direction to that in which the series of wheels 82 83 84 is moved by the pins 80 81, acting on the wheel 82, as clearly indicated by the arrow, Fig. 6. The wheels 94 95 are thus caused to roll and rotate the spur-wheel 92 in one or the other direction, according as the one or the other of the electromagnet pairs 65 66 and 67 68 is energized by the current and the corresponding armature 72 or 73 is put in oscillation. The spur-wheel 92 meshes with a spur-wheel 97, attached to a shaft 98 parallel with the shaft 85. (See also Figs. 4 and 5.)

Shaft 98 is provided with a worm 99, engaging a worm-wheel 100, attached to a vertical shaft 101, at the upper end of which there is a worm 102, engaging a worm-wheel 103, fastened to one end of a screw-spindle 104, journaled in the pointer 55. In order to compensate for errors of measurement due to the curvature of the surface of the earth, the threads of the screw-spindle can suitably increase in pitch toward the outer end. The screw-spindle 104 is engaged by a nut, forming a part of the cursor 57, which is thus brought to move along the pointer 55 in one or the other direction, according as the one or the other of the electromagnet pairs 65 66 and 67 68 is energized by the current, this in its turn being dependent upon the direction in which the inductor 35 is turned by means of the crank 14. (Compare the diagram Fig. 7.) It is easily understood that the cursor 57 can be made to move along the pointer 55 proportionally with the movement of the cursor 9 of the determinator.

The arrangements for the transmission of motion from the armatures 70 71, operated by each of the electromagnet pairs 61 62 and 63 64, to the pointer 55 are perfectly analogous with those by which the cursor 57 is brought to move along the pointer. According as one or the other of the electromagnet pairs 61 62 and 63 64 is energized by the current and puts the corresponding armature 70 or 71, respectively, in oscillation the shaft 105, corresponding to shaft 98, is caused to rotate in one or the other direction. The shaft 105 is provided with a worm 106, engaging a worm-wheel segment 107, connected with the pointer 55, the center of said segment coinciding with the fulcrum of said pointer. The pointer is thus brought to turn in one or the other direction according as one or the other of the electromagnet pair 61 62 or 63 64 is energized by the current. This in its turn being dependent of the direction in which the inductor 36 is turned by means of the crank 23, it is easy to understand that the pointer 55 can be made to repeat exactly the same motion as the horizontal movement of the telescope of the determinator.

The cursor 57 is fitted with a pin 108, catching in a groove or slot 109 in the index 59. In consequence of the combined movements of the pointer 55 and the cursor 57 the index 59 will always bear in a direction exactly corresponding to that of the observed object with relation to the place of firing. This direction may be read off directly from either of the two graduated scales 110 111, for which purpose two apertures 112 113 are made in the index 59, each provided with two sighting-threads, one of which is placed vertically above the other. The reason why the map 53 is provided with two graduated scales 110 111 is to make it possible to always read off the direction of the index 59, even when the pointer 55 partly or entirely hides or covers the one or the other of the apertures 112 and 113 in the index 59. The object in view may, however, be attained with only one graduated scale, if this one be given a sufficiently large radius. The distance from the firing place to the object watched from the place of observation is indicated by the scale 58 at the point where the scale is intersected by the sighting-threads of the pointer 55 and those of the cursor 57. Thus the exact range and bearing of the object watched from the place of observation may at any moment be ascertained at the place of firing without any reading being necessary at the former place. All the movements of the object under observation may be narrowly watched from the firing place in spite of the fact that the object is not visible from there.

The described arrangements for causing the pointer 55 to turn around a point on the map corresponding to the place of observation and for moving the cursor 57 along the pointer only serve to explain the principle of the invention and may be substituted by any other suitable arrangements by which the same result can be attained. The circuits by which the electrical impulses are transmitted from the determinator to the electromagnets of the indicator may be arranged in different ways.

In the form of construction of the determinator shown in Fig. 8 the movement of the telescope about its fulcrum or pins 5 is effected by means of a movable screw 115 against the ruler 10, the upper part of the screw, which is of angular section, being fitted in a corresponding aperture in a guiding-sleeve 116, while its lower screw-threaded part is screwed into a boring in the upper part of a vertical shaft 117. When the shaft 117 is turned in either direction, the screw 115, which cannot turn on account of the guiding-sleeve 116, is given a corresponding motion upward or downward. The shaft 117 is turned by means of the crank 14, Fig. 9, the shaft of which is provided with a worm 118, engaging a worm-wheel 119, attached to the lower end of the shaft 117. Inasmuch as the motion of screw 115 may be very small, the gearing from the crank-shaft should be rather large.

The form of construction of the determinator shown in Figs. 8 to 10 is in distinction from that shown in Fig. 1, intended to work with battery-current instead of with alternating currents. Disposed on a wall 120 in the operation-box 3 concentrically with the crank-shaft and at an interdistance of ninety degrees are four isolated contacts 121 122 123 124. In Fig. 9 only two of these contacts are visible. Every other of these contacts is connected with the positive and every other with the negative pole of an electric battery or other current source. (Not shown.) Fastened to the crank-shaft is a disk 126, carrying two isolated contacts 127 128, placed at the same distance from the crank-shaft as the contacts 121 122 123 124 on the wall 120 and at a distance from each other of ninety degrees. On turning the crank-shaft the contacts 127 and 128 are alternately brought in contact with a positive and a negative contact on wall 120. The contacts 127 and 128 may conveniently have an oblong form, so that the same after leaving a positive contact on wall 120 immediately touch a negative contact, and inversely. Thus when the crank 14 is turned the polarity of the contacts 127 and 128 on the disk 126 changes continuously. The contacts for the conducting-wires leading to the indicator may be arranged in the same manner as the contacts at the inductor-shafts of the determinator described with reference to Figs. 1 and 2. Each of the contacts 127 and 128 on the disk 126 is electrically connected with one of two rings 137 and 138, fastened to the crank-shaft. Placed around the ring 138 is a sleeve 140, provided with a contact-finger 143, entering between two fixed contacts 141 142. When the crank-shaft is turned in either direction, the contact-finger 143 is brought in contact with one or the other of the contacts 141 and 142. A brush 139 presses against the ring 137, and from the contacts 141 142 and brush 139 conductors 144 145 146, corresponding, respectively, to conductors 44, 45, and 46, Fig. 7, lead to the contacts 47 48 49 shown in Fig. 7. The current-transforming arrangements and contacts at the crank-shaft, by means of which the telescope is turned in the horizontal plane, may be analogous. The action on the indicator of the determinator shown in Figs. 8 and 9 is the same as that before described.

When using the apparatus, the indicator should first be adjusted, which can be done by directing the telescope of the determinator toward a certain mark in the field of view (the zero-mark) at the same time as the pointer and the cursor of the indicator are moved by hand to the zero-point set off in the indicator-map. The sighting-line of the pointer determined by the two sighting-threads then points in the same direction on the map as the optical axis of the telescope in relation to the field of observation, so that a plane through the sighting-threads of the pointer will intersect the same points on the map as a vertical plane through the optical axis of the telescope in the field. The position of the cursor corresponds, too, with the angle of depression of the telescope. After these adjustments having been made and the connections having been put in order the instruments are ready for use by turning the cranks of the determinator until the hair diaphragm of the telescope falls in with the observed object—for instance, the water-line of a ship. In operation the pointer of the indicator is turned an angle of exactly the same size as that described by the optical axis of the telescope, and at the same time the cursor moves along the pointer to the spot on the map corresponding to the position of the object under observation. Thus the position of the object is indicated on the map by a vertical line through the sighting-threads of the pointer and of the cursor. Proceeding as stated, it is thus possible through observation from a single point to indicate automatically the position of an object at any moment and at any spot, however distant from the place of observation.

The advantages gained by the system described as compared with the methods hitherto employed in secondary bombardment are so great and palpable that comments would be superfluous. The instruments may of course be used for other purposes than secondary bombardment—for instance, in firing mines, &c., or for taking ranges at sieges or the like.

With slight modifications in details the apparatus described can be easily adjusted so as to automatically compensate for different water-levels, (high-water and low-water,) for the error of temperature, the wind, the rotation of the projectile, &c.

Having now described my invention, what I claim as new, and desire to secure by Letters Patent, is—

1. In an apparatus for automatically indicating, at a receiving-station, the instantaneous position of an object observed from a single observing-station, the combination with a sighting apparatus at the observing-station, a map or chart at the receiving-station, a pointer adapted to move over the said map or chart, and means for moving the said pointer in accordance with the horizontal movement of the sighting apparatus, of a cursor adapted to move along the said pointer, means for causing the cursor to automatically move inwardly or outwardly according as the sighting apparatus is adjusted for a more or less distant object, and a second pointer or index moved by the said cursor about a point of the map or chart corresponding to the receiving-station, substantially as described.

2. In an apparatus for automatically indicating, at a receiving-station, the instantaneous position of an object observed from a single observing-station, the combination with a sighting apparatus at the observing-station, a map or chart at the receiving-station, a pointer adapted to move over the said map or chart, and means for moving the said pointer in accordance with the horizontal movement of the sighting apparatus, of a cursor adapted to move along the said pointer, means for causing the cursor to automatically move inwardly or outwardly according as the angle of depression of the sighting apparatus is increased or decreased, and a second pointer or index moved by the said cursor about a point of the map or chart corresponding to the receiving-station, substantially as described.

3. Apparatus for automatically indicating, at a receiving-station, the instantaneous position of an object observed from a single observing-station, characterized by the combination of a sighting apparatus placed at the observing-station, a crank by which the angle of depression of the sighting apparatus can be altered as desired, means operated by the crank for transmitting an alternating current from the observing-station, two contact-pieces at the said station, a contact-finger adapted to be brought into contact with one or the other of the said contact-pieces, according as the crank is rotated in one or the other direction, circuits connected with the said contact-pieces, electromagnets included in each of the said circuits, polarized armatures operated by the said electromagnets, a movable pointer, means for moving the said pointer in synchronism with the movement of the sighting apparatus in the horizontal plane, a screw rotatably mounted in the said pointer, means for transmitting motion from the armatures of the electromagnets to the said screw, so as to cause the latter to rotate in one or the other direction, according to the direction of rotation of the crank at the observing-station, and a cursor mounted on the said screw in such a manner as to be moved in one or the other direction along the screw according to the direction of rotation of the latter, substantially as described.

In witness whereof I have hereunto signed my name in the presence of two subscribing witnesses.

KARL OSKAR LEON.

Witnesses:
SVEN OTTO SVENSSON,
ERIC JOHANSSON.